United States Patent

Grau et al.

[11] Patent Number: 6,044,090
[45] Date of Patent: Mar. 28, 2000

[54] METHOD AND APPARATUS FOR CHANNEL MANAGEMENT IN A COMMUNICATION SYSTEM

[75] Inventors: Alan Grau, Bloomingdale; William Hanks, Streamwood; Jannet Shaw, Arlington Hts., all of Ill.

[73] Assignee: Motorola, Inc., Schaumburg, Ill.

[21] Appl. No.: 08/774,341

[22] Filed: Dec. 30, 1996

[51] Int. Cl.[7] .................................................. H04J 1/00

[52] U.S. Cl. .............................................. 370/485; 348/6

[58] Field of Search ................................. 348/6, 12, 13; 455/3.1, 4.1, 5.1, 6.1, 4.2; 370/252, 242, 343, 344, 480, 485, 486, 487

[56] References Cited

U.S. PATENT DOCUMENTS 5,164,938 11/1992 Jurkevich et al. ........................ 370/60
5,847,660 12/1998 Williams et al. ................... 340/825.03

*Primary Examiner*—Ajit Patel
*Attorney, Agent, or Firm*—Romi N. Bose

[57] ABSTRACT

A communications controller (132) transfers communication links from a first receiver (144) to a second receiver (146) when a system quality parameter exceeds a threshold. The first receiver (144) is used to perform idle carrier scanning by tuning to each idle carrier and executing a quality metric measuring procedure for the carrier or a channel on the carrier. The quality metrics are stored in memory (160) and the idle carriers are ranked according to their corresponding quality metrics. The communication controller (132) adds or replaces carriers based on their ranking. In this manner, communication channels may be more efficiently managed.

21 Claims, 3 Drawing Sheets

METHOD AND APPARATUS FOR CHANNEL MANAGEMENT IN A COMMUNICATION SYSTEM

BACKGROUND OF THE INVENTION

The present invention relates, in general, to communication systems and more particularly to channel management in communication systems.

In communication systems, such as cable telephony systems, having several remote units communicating through a head-end office, communication channel management is critical to maintain high quality service. Information is typically transmitted through communication channels using radio frequency carriers. A carrier may contain one or more channels depending on the type of communication system. The head-end office typically contains several receivers for receiving the several different carriers. Noise at any carrier frequency may distort the information and decrease the quality of service for a channel on that particular carrier. To increase quality of service, systems manage the channels by monitoring the carriers and using only the higher quality channels for transmitting information.

One attempt at managing channels in a communication system includes measuring channels on carriers that are currently being used for communication. A quality measurement procedure is performed on a channel on a particular carrier to obtain quality information on the carrier. However, since at least one channel is used for communication (transmitting user data) on that particular carrier, the receiver must remain tuned to the frequency of that carrier. Systems typically have carriers that are not used for communication, referred to as idle carriers. In systems that measure the quality of a carrier or channel which contains communication information, the idle carriers can not be measured with the receivers that are receiving communication information.

Another attempt at managing channels includes using a dedicated receiver for scanning idle channels. In systems that have idle channels available, a dedicated receiver may be used to measure the quality of a communication channel. The dedicated receiver is tuned to each idle channel in turn and each channel is measured for quality. The channels are then allocated to provide communication links based on the quality of each channel. In these systems, the dedicated receiver is used only for measuring the quality of the communication channels. These systems are inefficient since the resources of an entire receiver must be dedicated to measuring idle carriers. The added expense of a communication system in providing an extra receiver at each head-end office is significant.

Therefore, conventional systems either cannot measure idle carriers or do not efficiently utilize the hardware at the head-end office and there exists a need for an efficient cable management method and apparatus that can fully utilize the receivers at the head-end office for communication while monitoring the quality of idle channels.

DETAILED DESCRIPTION OF THE DRAWINGS

The present invention provides a method and apparatus for efficiently managing communication channels in a communication system.

The communication system manages communication channels by transferring communication links from a first receiver to one of the other receivers at the head-end until the first receiver is able to scan the idle carriers in the system. In the preferred embodiment, communication links are only transferred if a first quality parameter exceeds a threshold. If sufficient bandwidth is not available to transfer the communication links and a second threshold is exceeded, new calls are blocked. The system measures the quality of the channels, determining a quality metric for each idle carrier or channel, and allocates channels for communication according to the quality metrics. By utilizing the method and apparatus of the present invention, all the receivers in a head-end office can be used for communication while maintaining quality metric data on idle channels.

Figure 1:
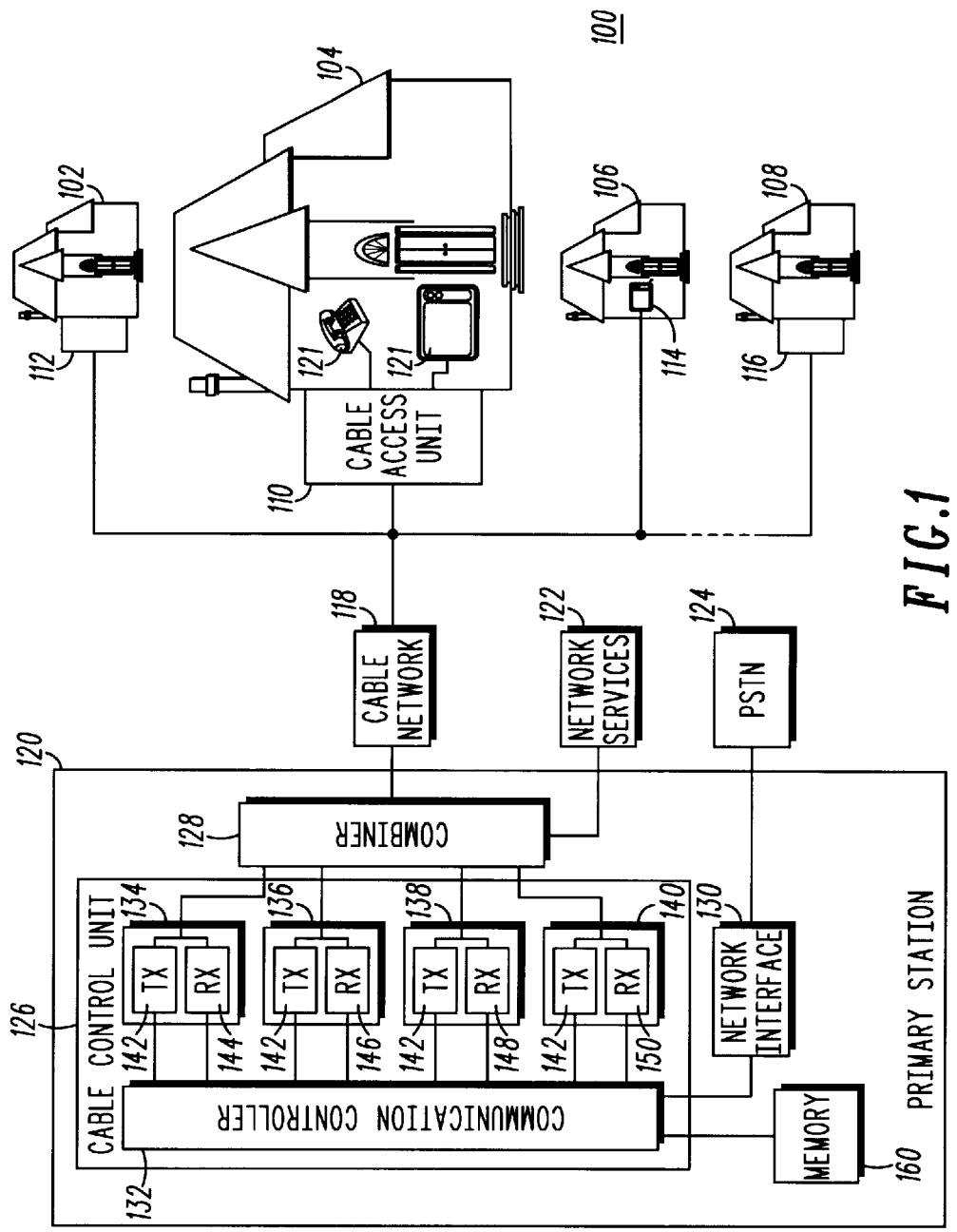
FIG. 1 is a block diagram of a preferred embodiment of a cable communication system in accordance with the present invention.

FIG. 1 is a block diagram of a cable communication system in accordance with the preferred embodiment of the present invention. A cable access unit (remote unit) 110 transmits upstream signals from customer premise equipment 121, such as a telephone, to a primary station 120 ("head-end office") through a cable network 118 using upstream channels on upstream carriers. The signals are received by the primary station 120 through one of a plurality of receivers (144–150) and sent to a Public Switch Telephone Network (PSTN) 124. Downstream signals are received by the primary station 120 from the PSTN and transmitted by a transmitter 142 through the cable network 118 to the cable access unit 110 using downstream channels on downstream carriers. Each receiver 144–150 is tuned to a particular carrier frequency which contains several upstream communication channels. The number of carrier frequencies available for upstream communication is greater than the number of receivers (144–150) in the primary station 120. Therefore, at any particular time, several carriers (referred to as idle carriers) will not be in use. The number of receivers 144–150 used for communication depends on the number of subscribers communicating through the cable control unit 126.

When call traffic is low or, in other words, a relatively small number of subscribers are communicating through primary station 120, at least one receiver (144–150) will not be used for communication. In this situation, one of the receivers (e.g. first receiver 144) is used for scanning the idle carrier frequencies. A communication controller 132 instructs the receiver 144 to tune to each of the idle carriers. As will be discussed below, a quality metric measuring procedure is performed for each carrier. The quality metric for each carrier is stored in memory 160 and is used to allocate carrier frequencies for communication.

In times of heavy call traffic, the number of subscribers communicating through the primary station 120 may require that all of the receivers 144–150 in the primary station be used for communication and no receiver 144–150 is available to scan the idle carriers. The communication controller 132 compares a first quality parameter of the system to a predetermined first threshold as discussed below. If the first quality parameter exceeds the threshold, the communication controller 132 chooses a receiver 144–150 having the fewest active calls (e.g. first receiver 144) and transfers the calls (communication links) to other receivers 146–150 (also referred to as secondary receivers). The communication controller 132 transfers the communication links by communicating with each cable access unit 110–116 communicating with the first receiver and instructing the cable access units 110–116 to change frequencies in a procedure typically referred to as alternate link transfer (ALT). After all the ALTs are performed to clear the first receiver (remove all active calls), each cable access unit (110–116), previously communicating with the first receiver 144, uses a new carrier frequency for upstream communication.

Once cleared, the first receiver 144 is used for idle carrier scanning. The first receiver 144 tunes to each idle carrier and executes a quality metric measuring procedure to produce a quality metric for each idle carrier. The quality metric measuring procedure may include measuring a signal to noise ratio or, preferably, a noise level for at least one channel on the carrier. Other methods of measuring the quality of the carrier may also be used. The quality metric is stored in memory 160 and used to rank the carriers. If noise increases and alternate carrier frequencies are needed for communication, the communication controller 132 will allocate alternate carriers according to their quality metric ranking. The communication controller will reassign a new carrier from the ranked idle carriers if the quality of any carrier being used for communication drops below a specified level.

In the preferred embodiment, the communication controller 132 will not perform ALTs to clear the first receiver 144 until it determines that sufficient bandwidth is available in the communication system 100 to transfer the calls from the first receiver 144. Alternatively, the communication controller 132 will continually transfer calls from the first receiver 144 to other receivers (146–150) as channels become available on other receivers If sufficient bandwidth is not available, the communication controller 132 determines if a second criteria is met before performing ALTs to clear a receiver 144. If a second quality parameter exceeds a second threshold and sufficient bandwidth is not available in the communication system 100, the communication controller 132 blocks new calls. The second quality parameter is a predetermined value representing the quality of communication on the system 100 and is preferably a number indicating the time elapsed since the last quality metric procedure has been performed. Since subscribers will eventually end their calls and no new calls are allowed, the available bandwidth in the communication system 100 will increase over time. When sufficient bandwidth is available, the communication controller 132 clears the receiver with the fewest number of active calls (e.g. first receiver) by performing ALTs. The communication controller 132 executes the quality measuring procedure as discussed above.

Therefore, all the receivers 144–150 in the primary station 120 can be used for communication and when the communication controller 132 determines that idle carrier scanning is desirable, the communication controller 132 clears a receiver 144 and executes a quality metric measuring procedure.

Continuing to refer to FIG. 1, the cable access units (110, 112, 116) may be mounted on the outside of the customer premise (102, 104, 108) or the cable access unit 114 may be located inside the customer premise 106 in a location such as the basement. In accordance with the present invention, the cable access units 110–116 provide audio and video telephony and conferencing services through, a cable network 118, preferably, using hybrid fiber coaxial cable (HFC). The cable network 118 (which may have multiple configurations) is connected through a primary station 120 to network services infrastructure 122 that may include cable television (CATV), data services, or other communication services, and to the PSTN 124.

Continuing to refer to FIG. 1, a primary station 120 includes a control unit referred to as a cable control unit (CCU) 126, a network interface 130, a combiner 128, and is operably coupled to the network services infrastructure 122. The CCU 126 consists of a communications controller 132 and a bank of transceivers 134–140 also referred to as cable port transceiver (CPX) cards in the preferred embodiment. Each transceiver (134–140) contains a transmitter 142 and receiver (144–150). The communications controller 132 transmits and receives industry standard time division multiplexed (TDM) signals, through the network interface 130. The TDM signals are sent to and from a local telephone switch in the PSTN 124. In the preferred embodiment, incoming (received) signals from the PSTN 124 to the communications controller 132 are converted to an internal signaling format, may also have TDM time slots interchanged, and are then routed to the transceivers (134–140). The transceivers (134–140) convert the received signals to radio frequency signals, preferably frequencies compatible with cable television (CATV) networks. The primary station 120 provides concentration of the resources of the communication system 100 through time slot and frequency management techniques.

In the preferred embodiment, signaling over the communication system 100 uses a protocol referred to as Cable Access Communication System (CACS) transmission and reception of data such as voice, video, computer files and programs, and other information (collectively referred to as data or communication information). However, other protocols compatible with the particular communication system 100 could be used. CACS is a multi-layered protocol, developed by Motorola, Inc., consisting of a plurality of 768 kbps II/4-DQPSK (differential quadrature phase shift keying) modulated RF carriers (carriers) using TDM framing in the downstream path (from the primary station 120 to a cable access unit 110) and TDMA (time division multiple access) in the upstream path (to the primary station 120 from a cable access unit 110). In the preferred embodiment, each CACS carrier supports as many as eight time slots of individually addressable user data packets, in which each packet contains 160 bits of user data (the "payload" or "communication information") plus address and error correction information. The preferred CACS frame rate is 400 frames per second, providing a net user data throughput of 64 kbps (kilobits per second) for each assigned time slot. Time slots also may be concatenated to provide even greater data rates, for example, up to 512 kbps when all eight time slots are assigned to a single user.

As a consequence, N×64 kbps service may be supported with the CACS protocol, where N is the number of assigned time slots. In the case of connectivity for telephony commonly known as POTS (Plain Old Telephone Service), a single time slot is used in which digital PCM (pulse code modulated) audio samples are transported in the payload of the CACS time slot. In the case of connectivity for higher rate services, such as basic rate Integrated Services Digital Network (ISDN) (two 64 kbps B channels plus one 16 kbps D channel), two or more time slots are used to transport the user (commonly called "bearer") data. For video conferencing and telephony service, compressed digital audio and video signals may occupy from one to multiple time slots per carrier (e.g., 8 time slots per carrier), depending on the method of compression used and the desired quality of the service.

Also in the preferred embodiment, modulated CACS RF carriers occupy an RF bandwidth of 600 kHz and may be assigned anywhere within the downstream and upstream CATV frequency bands. Typically, in domestic, North American CATV systems, the downstream band has been designated from 50 to 750 MHz, with an upstream band designated from 5 to 40 MHz. Referring to FIG. 1, for transmission to the user premises 102–108, the transceivers 134–140 receive a TDM data stream from the communications controller 132 and create CACS frames of eight time slots, along with associated overhead signaling information (including error control data), resulting in a 768 kbps data stream. The data stream is then converted to a Π/4-DQPSK signal, which in turn is then upconverted in frequency from baseband to an RF carrier within the CATV downstream band. This Π/4-DQPSK signal may then be optionally combined (in the combiner 128 of the primary station 120) with other video services signals from the network services infrastructure 122, and transmitted through the cable network 118.

At the receiving end, as discussed in greater detail below, a cable access unit 110 downconverts the CACS carrier to baseband and demodulates the Π/4-DQPSK signal, resulting in received CACS frames. Time slot information (i.e., the data in the payload) is then extracted from the CACS frames and transferred to an audio CODEC in the case of telephony (a POTS call), or transferred to an audio/video compression and decompression subsystem in the case of a video conferencing call or session. Conversely, for upstream transmission, voice or video data originating, respectively, from the audio CODEC or an audio/video compression and decompression subsystem, is put into CACS protocol formatted TDMA data packets. The TDMA data packets are then converted into a Π/4-DQPSK signal, upconverted to an RF carrier, and injected into the upstream path of the communication system 100. In turn, one of the receivers 144–150 receives the upstream signal from a cable access unit 110, RF downconverts the signal to baseband and demodulates the Π/4-DQPSK signal, resulting in a received TDMA data packet. The user data is then extracted from the packet and transferred to the communications controller 132, that reformats the user data into an appropriate network signal (analog or digital) and, through the network interface 130, transmits the network signal, multiplexed with other signals, to the PSTN 124.

In the preferred embodiment, the CACS protocol consists of three types of signaling channels which use designated time slots on CACS carriers. A first type of signaling channel, referred to as a broadcast channel, is utilized to transmit general system information, only in the downstream direction to the various cable access units 110, and to transmit information such as terminating alerts to a cable access unit 110 when a call is to be received from the PSTN 124. A plurality of a second type of signaling channel, referred to as access channels, are used by the various cable access units 110 to gain access to the communication system 100 or the PSTN 124 or to transmit the necessary information to perform an ALT. A plurality of a third type of signaling channel, referred to as traffic channels, are full-duplex and are used to transport user data to and from the PSTN 124.

Preferred traffic channels may consist of one or more time slots and are assigned to users based on demand (trunked) from a pool of available time slots. A traffic channel is assigned for the duration of a call (POTS, ISDN, or video), and upon call termination, is subsequently released to the pool of available time slots. When a cable access unit 110 first powers up, it registers with the CCU 126 by first scanning the downstream spectrum for a CACS broadcast channel, synchronizing with that channel, and obtaining information concerning a location of an access channel. On the access channel, the cable access unit 110 requests an assignment of a traffic channel, and then transmits a registration message over the assigned traffic channel of the plurality of traffic channels. After registration is complete, the cable access unit 110 may make or receive calls through the PSTN 124.

If a call origination is required, the cable access unit 110 makes a request to the CCU 126 for the required number of time slots through the access channel. The CCU 126 then grants the request and assigns a traffic channel (carrier frequency and associated time slot(s)). If a call delivery is required, the CCU 126 alerts the identified cable access unit 110 of an incoming call over the broadcast channel. Via the access channel, the cable access unit 110 then requests a traffic channel. The CCU 126 grants the request and a traffic channel is assigned.

The CACS protocol also provides the capability for transferring calls to other available carrier frequencies and time slots through the ALT procedure. The communication controller 132 transmits a transfer message that includes a transfer carrier frequency to the cable access unit 110. Preferably, the quality of all user traffic channels is continuously monitored, and if the quality starts to degrade due to noise, the call is transferred to another RF carrier having less noise.

The communication controller 132 continually monitors the quality of the communication carriers (carriers currently used for communication). If it is determined that quality of a communication carrier has degraded to the point that it must be replaced with an idle carrier, the communications controller 132 chooses an idle carrier from a ranked list of idle carriers stored in memory 160.

The communication controller 132 ranks and stores the quality metrics of the idle carriers. If an idle receiver (144–150) is available, the communication controller 132 executes a quality metric measuring procedure. Preferably, the quality metric measuring procedure includes tuning to each idle carrier and measuring a noise level. A quality metric is assigned to each idle carrier according to the noise level measured. However, other types of quality metric measuring procedures may be used depending on the particular communication system 100. The idle carriers are ranked by their quality metric values and stored in memory 160.

As discussed above, during times of high call traffic, no idle receivers are available. All the receivers 144–150 are used for communications in these situations. If the communication controller 132 determines that no receivers are available for scanning the idle carriers, the communication controller 132 determines if a first quality parameter for the communication system 100 is greater than a first threshold. Preferably, the first quality parameter is the duration of time from when the last quality metric procedure was executed. The value of the quality metric is directly proportional to the duration of time.

The first quality parameter may be derived from other information. For example, the values of the QMs of the idle carriers, the quality of the carriers used for communication, the number of idle channels, or a combination of some or all of the these values may be used to derive the first quality parameter.

The first threshold is, preferably, determined based on the particular communication system 100. The first threshold may be calculated using known techniques and is chosen to balance the number of ALTs performed and the quality of service. The first threshold is preferably chosen during the design of the particular communication system 100 but may be changed depending on the performance of the communication system 100.

If the communication controller 132 determines that the first quality parameter is not greater than the first threshold, the communication controller 132 continues to check if a receiver 144–150 has become idle.

If the first quality parameter is greater than the first threshold, the communication controller 132 determines if the communication system 100 has enough available bandwidth to handle all the calls (communication links) on the receiver (e.g. first receiver 144) that is servicing the least number of calls. In other words, the controller determines if a total idle bandwidth equal to the addition of the available bandwidth on each receiver (146–150) is adequate for handling the calls (communication links) of the first receiver 144. The receiver 144 with the least number of active calls is chosen in order to minimize the number of ALTs that will be performed. However, other criteria may be used to determine which receiver 144–150 will be used for scanning the idle carriers or channels.

If adequate bandwidth exists in the system, the controller performs ALTs to transfer the communication links from the first receiver 144 to at least one of the other receivers 146–150 (secondary receivers).

The communication controller 132 executes a quality metric measuring procedure through the first receiver 144 after all the communication links have been transferred.

If the communication controller 132 determines that the available bandwidth on the other receivers 146–150 is inadequate to service the calls (handle the communication links) on the first receiver 144, the communication controller 132 determines if a second quality parameter for the communication system 100 is greater than a second threshold. In the preferred embodiment, the second quality parameter is equal to the first quality parameter. However, the second quality parameter may be a different value than the first quality parameter and may be derived from the first quality parameter, from a duration of time since the last execution of the quality metric procedure, the number of idle channels the number of currently active calls or any other information or combination of information.

The second threshold is, preferably, determined based on the particular communication system 100. The second threshold may be calculated using known techniques and is chosen to balance the number of calls blocked and the quality of service. In the preferred embodiment, the second threshold is greater than the first threshold. The second threshold is preferably chosen during the design of the particular communication system but may be changed depending on the performance of the communication system 100.

If the communication controller 132 determines that the second quality parameter is not greater than the second threshold, the communication controller 132 continues to wait for the call traffic to decrease and a receiver 144–150 to become idle.

If the communications controller 132 determines that the second quality parameter is greater than the second threshold, the communication controller 132 blocks new calls. Calls are blocked in the following manner. If a subscriber tries to place a call, the CCU 126 indicates to the cable access unit 110 that no channels are available for communication through a signaling channel and an audible busy signal is sent from the cable access unit to the customer premise device using known techniques.

The communication controller 132 continues to block calls until enough bandwidth is available to transfer the communication links (active calls) from the first receiver 144 to the other receivers 146–150. When enough bandwidth is available, the communications controller 132 performs ALTs to clear the first receiver 144 and executes the quality metric measuring procedure.

Figure 2:
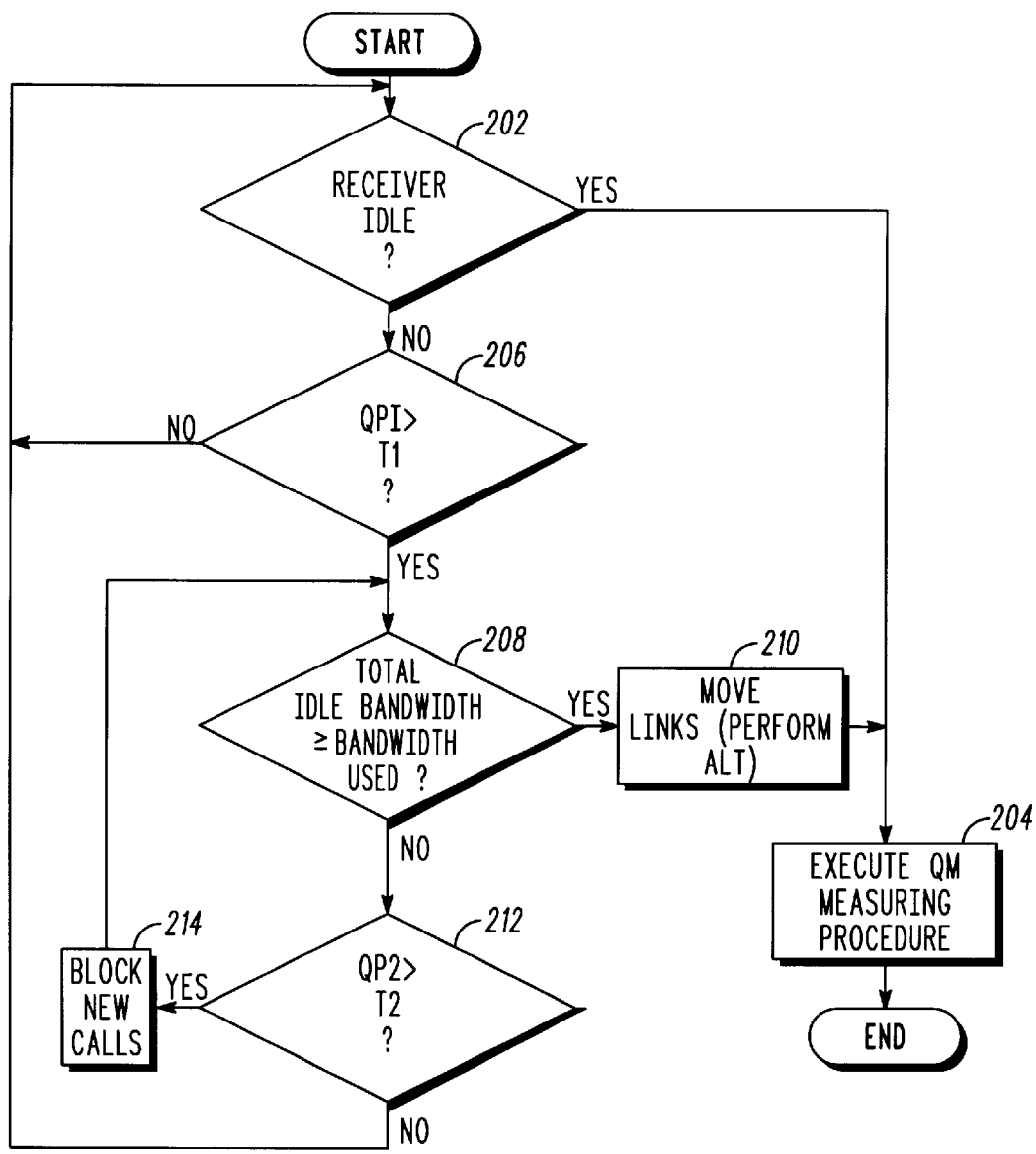
FIG. 2 is a flow chart of a method in accordance with the preferred embodiment of the invention.

FIG. 2 is a flow chart of a method in accordance with the preferred embodiment of the present invention. At step 202, the communication controller 132 determines if a receiver 144–150 in the CCU 126 is idle. As discussed above, an idle receiver is one not receiving any communication information from the cable access units. If at least one receiver 144 is idle, the method proceeds to step 204 where the communication controller executes a quality metric measuring procedure. If the communication controller 132 determines that no idle receiver is available for scanning at step 202, the method proceeds to step 206. The communication controller 132 determines if a first quality parameter (QP1) for the communication system 100 is greater than a first threshold (T1). If QP1 is not greater than T1, the method returns to step 202. If QP1 is greater than T1, the communication controller 132 determines if the total idle bandwidth in the communication system 100 is greater than or equal to the bandwidth in use on the first receiver 144 at step 208.

If enough bandwidth exists in the communication system 100, the communication controller 132 moves the communication links from the first receiver 144 to a second receiver at step 210. The second receiver 146 may be any one on the secondary receivers (146–150) with sufficient bandwidth for the communication link. The communication controller executes a quality metric measuring procedure at step 204.

If the communication controller 132 determines, at step 208, that the idle bandwidth required by the first receiver exceeds an available idle bandwidth, the method continues at step 212. At step 212, the communication controller 132 determines if a second quality parameter (QP2) is greater than a second threshold (T2). In the preferred embodiment T2 is greater than T1. If the QP2is not greater than T2 the method returns to step 202. If QP2 is greater than T2, the communication controller 132 blocks new calls at step 214, and returns to step 208. The method continues to determine if sufficient bandwidth is available to transfer the communication links and block new calls at step 208, 212 and 214.

When the communication controller 132 determines that enough idle bandwidth is available at step 208, it transfers the communication links at step 210 and executes the quality metric measuring procedure at step 204 as discussed above.

Figure 3:
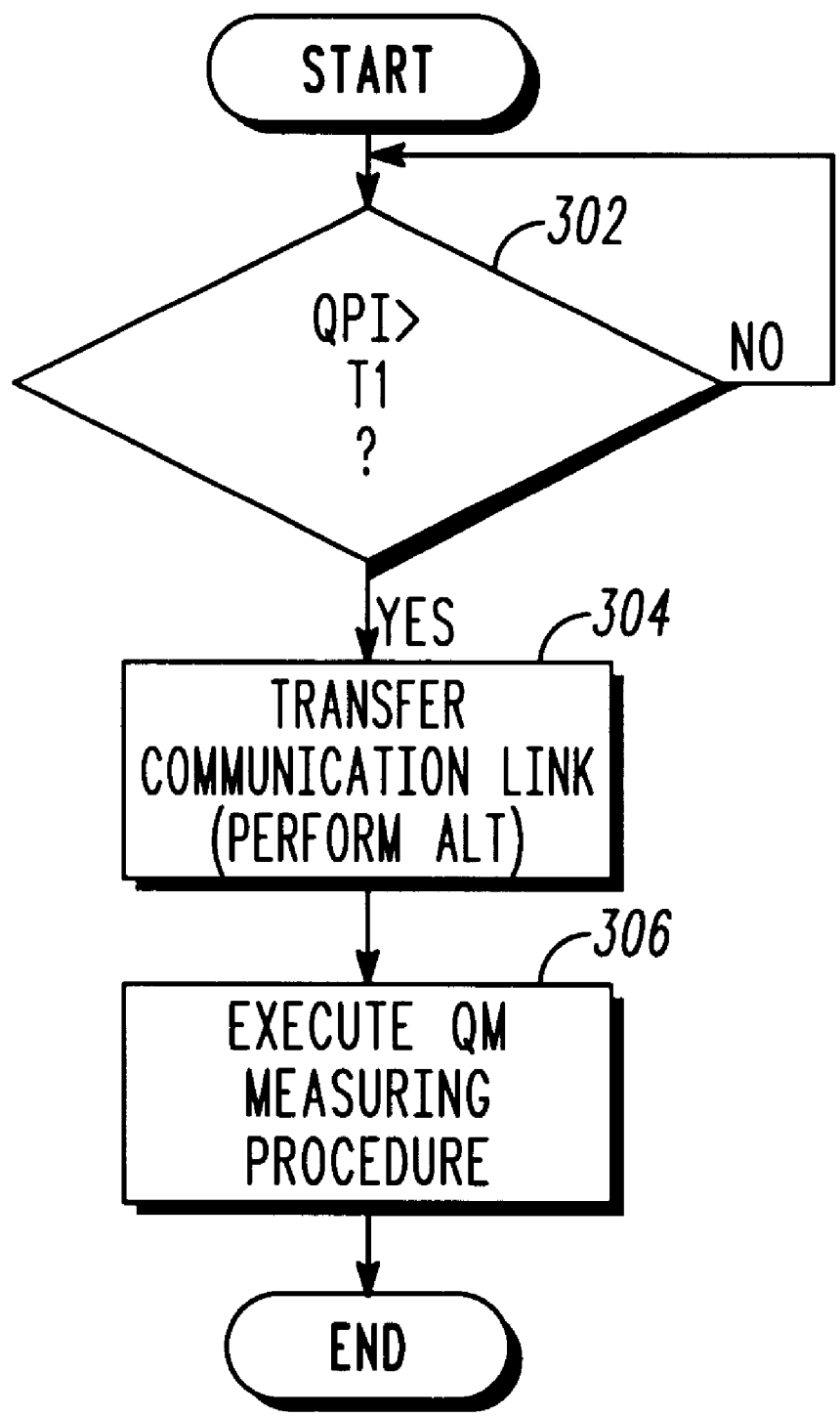
FIG. 3 is a flow chart of a method in accordance with an alternate embodiment of the present invention.

FIG. 3 is a flow chart of a method in accordance with an alternate embodiment of the present invention. At step 302, the communication controller 132 determines if a first quality parameter of the communication system 100 is greater than a first threshold. The first quality parameter is, preferably, derived from the duration of time since the execution of a QUALITY METRIC measuring procedure. If the communication controller 132 determines that the first quality parameters not greater than the first threshold the method returns to step 302 and the communication controller 132 continues to check the relationship between QP1 and T1. If the QP1 is greater than T1, the communication controller 132 transfers the communication links from a first receiver 144 to a second receiver 146 by performing ALTs at step 304. At step 306, the communication controller 132 executes a quality metric measuring procedure through the first receiver 144.

The present invention provides a method and apparatus for efficiently managing channels in a communication system 100. The communications controller 132 transfers communication links from a first receiver 144 to a second receiver 146. The first receiver 144 is used to perform idle carrier scanning by tuning to each idle carrier and executing a quality metric measuring procedure for the carrier or a channel on the carrier. The quality metrics are stored in memory 160 and the idle carriers are ranked according to their corresponding quality metrics. The communication controller 132 adds or replaces carriers based on their ranking. As a result, a communication system may be managed to efficiently utilize receivers at the primary station. Communication quality may be maintained by measuring the quality of communication channels without the requirement of additional equipment that is dedicated to performing quality measurements.

What is claimed is:

1. In a communication system having a remote unit, a public network and a plurality of receivers configured for communication between the remote unit and the public network, in which communications between the remote unit and the one or more of the plurality of receivers occur over a plurality of carrier frequencies, a method comprising the steps of:

receiving at least one communication link on a first receiver of the plurality of receivers;

transferring the at least one communication link from the first receiver to at least one secondary receiver of the plurality of receivers when a first quality parameter of the communication system exceeds a first threshold, the at least one secondary receiver being selectable from any of the plurality of receivers;

after the communication links have been transferred from the first receiver, using the first receiver to scan a set of the carrier frequencies that should be idle; and executing a quality metric measuring procedure to produce a quality metric for each idle carrier frequency in the set through the first receiver.

2. A method according to claim 1 wherein the first quality parameter is derived from a duration of time since a quality metric measuring procedure was last executed.

3. A method according to claim 1, the step of transferring a communication link comprising the steps of:

transmitting a transfer message including a transfer carrier frequency to a remote unit coupled to the first receiver through the communication link; and establishing the communication link between the second receiver and the remote unit on the transfer carrier frequency.

4. A method according to claim 1, the step of executing a quality metric measuring procedure including the steps of:

tuning the first receiver to a communication channel; and measuring a quality metric for the communication channel.

5. A method according to claim 4, wherein the step of measuring a quality metric for the communication channel includes the step of measuring a level of noise in the communication channel.

6. A method according to claim 4 wherein the communication channel is a radio frequency carrier.

7. A method according to claim 4 further comprising the steps of:

tuning the first receiver to a plurality of communication channels; and measuring a quality metric for each of the plurality of communication channels.

8. A method according to claim 9 further comprising the steps of:

assigning a plurality of communication links to the plurality of communication channels according to the quality metric for each of the plurality of communication channels.

9. A method according to claim 1 further comprising the step of blocking new calls only if sufficient bandwidth is not available in the communication system to transfer the at least one communication link and a second quality parameter exceeds a second threshold.

10. A method according to claim 9 wherein the second quality parameter is derived from a duration of time since a quality metric measuring procedure has been executed.

11. A method according to claim 10 wherein the first quality parameter is derived from at least one quality metric.

12. In a communication system having a remote unit, a public network and a plurality of receivers configured for communication between the remote unit and the public network, in which communications between the remote unit and the plurality of receivers occur over a plurality of carrier frequencies, a method comprising the steps of:

receiving at least one communication link on a first receiver of the plurality of receivers;

transferring the at least one communication link from the first receiver to at least a second receiver selected from any of the plurality of receivers when a first quality parameter of the communication system exceeds a first threshold, the first quality parameter is derived from a duration of time since a quality metric measuring procedure has been executed;

blocking new calls only if sufficient bandwidth is not available in the communication system to transfer the at least one communication link and when a second quality paranmeter exceeds a second threshold, the second quality parameter is derived from a duration of time since a quality metric measuring procedure on the set of idle carrier frequencies that should be idle has been executed;

after the communication links have been transferred from the first receiver, using the first receiver to scan a set of carrier frequencies that should be idle; and executing a quality metric measuring procedure to produce a quality metric for each idle carrier frequency in the set through the first receiver.

13. In a communication system having a remote unit, a public network and a plurality of receivers configured for communication between the remote unit and the public network, in which communications between the remote unit and the plurality of receivers occur over a plurality of carrier frequencies, an apparatus comprising:

a communication controller coupled to the plurality of receivers;

wherein a first receiver of the plurality of receivers establishes at least one communication link in the communication system and the communication controller transfers the at least one communication link from the first receiver to at least one secondary receiver of the plurality of receivers when a first quality parameter exceeds a first threshold in order for the communication controller to use the first receiver for scanning a set of carrier frequencies that should be idle and the communication controller executing a quality metric measuring procedure on the set of carrier frequencies that should be idle through the first receiver, the at least one secondary receiver being any available one or more receivers selected from the plurality of receivers.

14. An apparatus according to claim 13 wherein the first receiver is tuned to a first carrier frequency and the second receiver is tuned to a second carrier frequency.

15. An apparatus according to claim 13 further comprising a transmitter coupled to the communication controller, the transmitter responsive to the communication controller by transmitting a transfer message to the communication system when the communication controller transfers the communication link from the first receiver to the second receiver.

16. An apparatus according to claim 13 wherein the communication controller derives the first quality parameter from a duration of time since a quality metric measuring procedure has been executed.

17. An apparatus according to claim 13 wherein the communication controller blocks new calls when a second quality parameter exceeds a second threshold and an idle bandwidth required to transfer the at least one communication link from the first receiver to the at least one secondary receiver exceeds an available bandwidth in the communication system.

18. An apparatus according to claim 17 wherein the communication controller derives the second quality parameter from a duration of time since a quality metric measuring procedure has been executed.

19. In a communication system having a remote unit, a public network and a plurality of transceivers configured for communication between the remote unit and the public network, in which communications between the remote unit and the plurality of transceivers occur over a plurality of carrier frequencies, an apparatus comprising:

a communication controller coupled to the plurality of transceivers;

wherein a first transceiver of the plurality of transceivers establishes at least one communication link between the remote unit and the public network;

wherein the communication controller transfers the at least one communication link from the first transceiver to at least one secondary transceiver of the plurality of transceivers by transmitting a transfer message through the first transceiver to the remote unit when a first quality parameter exceeds a first threshold, the at least one secondary transceiver being selected from any of the plurality of transceivers;

the communication controller blocking new calls when a second quality metric exceeds a second threshold and an idle bandwidth required for transferring the at least one communication link from the first transceiver to the at least one secondary transceiver of the plurality of transceivers exceeds an available idle bandwidth; and the communication controller executing a quality metric measuring procedure on a set of carrier frequencies that should be idle through the first transceiver.

20. A method according to claim 1 wherein no apparatus in addition to the plurality of receivers is provided for scanning the carrier frequencies that should be idle.

21. An apparatus according to claim 13 wherein no apparatus in addition to the plurality of receivers is provided for scanning the carrier frequencies that should be idle.

* * * * *